United States Patent
Jackson et al.

(10) Patent No.: US 6,385,430 B1
(45) Date of Patent: May 7, 2002

(54) OVERLAPPING POSITION SENSORS FOR OBJECT POSITION TRACKING

(75) Inventors: Warren B. Jackson, San Francisco; David Kalman Biegelsen, Portola Valley, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/778,477

(22) Filed: Feb. 7, 2001

(51) Int. Cl.$^7$ ................................................ G03G 15/00
(52) U.S. Cl. .................... 399/371; 250/208.6; 257/448; 257/465; 358/488
(58) Field of Search ..................... 399/371; 358/488; 271/261; 250/559.15, 206.1, 208.6; 356/621; 702/150; 257/443, 448, 465, 466

(56) References Cited

U.S. PATENT DOCUMENTS

| | | | | |
|---|---|---|---|---|
| 5,567,976 A | * | 10/1996 | Dierschke et al. | 257/443 |
| 5,600,173 A | * | 2/1997 | Suzunaga | 257/446 |
| 5,629,517 A | * | 5/1997 | Jackson et al. | 250/208.1 |
| 5,969,371 A | * | 10/1999 | Anderson et al. | 250/559.15 |

* cited by examiner

Primary Examiner—Joan Pendegrass
(74) Attorney, Agent, or Firm—Perman & Green, LLP

(57) ABSTRACT

Position sensors having an active area are assembled into an array in which the electrodes of adjacent sensors are offset and interleaved so that the electrodes are adjacent an active area, thereby avoiding dead spots. The position sensor array is position adjacent to the path of an object opposite to a source of light. As the object passes it alters the distribution of light on the position sensor array that generates signals indicative of the objects position in response to the changes in impinging light.

16 Claims, 5 Drawing Sheets

OVERLAPPING POSITION SENSORS FOR OBJECT POSITION TRACKING

FIELD OF THE INVENTION

The present invention is directed to a system and method for automatically detecting the dimensions or edge of a document being scanned by a scanning system. More particularly this invention is directed to an overlapping sensor array which provides positioning accuracy independent of tracking distance and eliminates dead zones in large area scanning.

BACKGROUND OF THE INVENTION

Traditionally, the term copier, when used in the office equipment context, refers to a light lens xerographic copier in which paper originals are reproduced. Images of the original document are focused on an area of a photoreceptor, which is subsequently developed with toner. The developed image on the photoreceptor is then transferred to a copy sheet which in turn is used to create a permanent copy of the original.

Digital copiers are now available that perform the same functions as a light lens copier, except that the original image to be copied is not directly focused on a photoreceptor. Instead, with a digital copier, the original image is scanned by a device generally known as a raster input scanner (RIS) which is typically in the form of the linear array of small photosensors.

The original image is focused on the photosensors in the RIS. The RIS converts the various light and dark areas of the original image to a set of digital signals. These digital signals are temporarily retained in a memory and then eventually used to operate a digital printing apparatus or for other reproduction purposes. The digital printing apparatus can be any known type of printing system responsive to digital data.

With the migration of the copying and scanning systems to a digital base system, the systems face different problems than from the light lens or analog copying systems. More specifically, in a digital scanning system, the scanning system needs to locate the document in the operational sequence of the machine. This needs to be accomplished accurately for image processing and other functions.

In the past this tracking function was accomplished by an array of sensors which generate pixel signals representing the entire page. This creates a significant amount of extraneous data when all that is needed are data indicative of the edge of the document. A similar approach has been used utilizing individual or groups of position sensors place in a location in the document path at which the document is made to cast a shadow over the sensor which alters the output of the sensor and thereby generates an indication of the location of an edge of the document.

Position sensors of this type are available from, for example, SDT Sensors, Inc. of Hawthorne, Calif. These lateral photodiode position sensitive detectors comprise a semiconductor strip of silicon having a composition and structure that, when stimulated by the impingement of light, collects a current at each end of the strip. By a simple mathematical comparison of the relative currents at each electrode, the centroid of the light impinging on the strip can be determined. This data allows the position of an edge of a document to be determined as the object alters the distribution of light on the sensor strip. A problem with such sensors is that their accuracy falls off as the centroid of light approaches either of the electrodes. This hinders the assembly by abutment of such sensors into arrays as dead spots will occur that detract from the reliability and accuracy of the generated data.

It is an object of this invention to provide a simple sensing device for tracking the position of an edge of a document or other object as it proceeds through the operational cycle of a machine such as a printer or multifunction digital scanner. It is a further object of this invention to construct an array of semiconductor position sensors to accomplish edge tracking without dead spots. The invention may be used to determine the position of any object along an object transport path with a prescribed resolution throughout. It is particularly suited for large area tracking.

SUMMARY OF THE INVENTION

Semiconductor position sensors consisting of strips of light sensitive silicon composition film are constructed with electrodes at either end of each strip that collect currents generated by impinging light on the sensors. The sensor strips are strategically positioned in the path of an object whose position is to be monitored. As the object passes by the sensor the impingement of light on the sensor is altered. The currents generated are indicative of the position of the centroid of light impinging on the strip. From this data, the position of the edge of an object passing the position sensor can be monitored. According to this invention, multiple position sensors are assembled into an array in which the electrodes at the ends of individual sensors are positioned in overlapping interleaved relation to adjacent sensors. The array is assembled to form a sensing plane in which each sensor is located next to another sensor, but offset so that an edge image or shadow, passing from one electrode to the other of a particular sensor, is always positioned on the central zone of high accuracy of at least one sensor. This can be accomplished by physical placement of individual sensors or by shaping the sensor strips to allow the necessary interleaving. It also can be accomplished by a patterned installation of the electrodes to form sensing zones on a strip in which each zone can function substantially the equivalent of individual sensors.

DESCRIPTION OF THE DRAWINGS

The present invention will now be described by way of example with reference to the accompanying drawings, wherein like reference numerals refer to like elements, and in which.

DESCRIPTION OF THE PREFERRED EMBODIMENT

Figure 1:
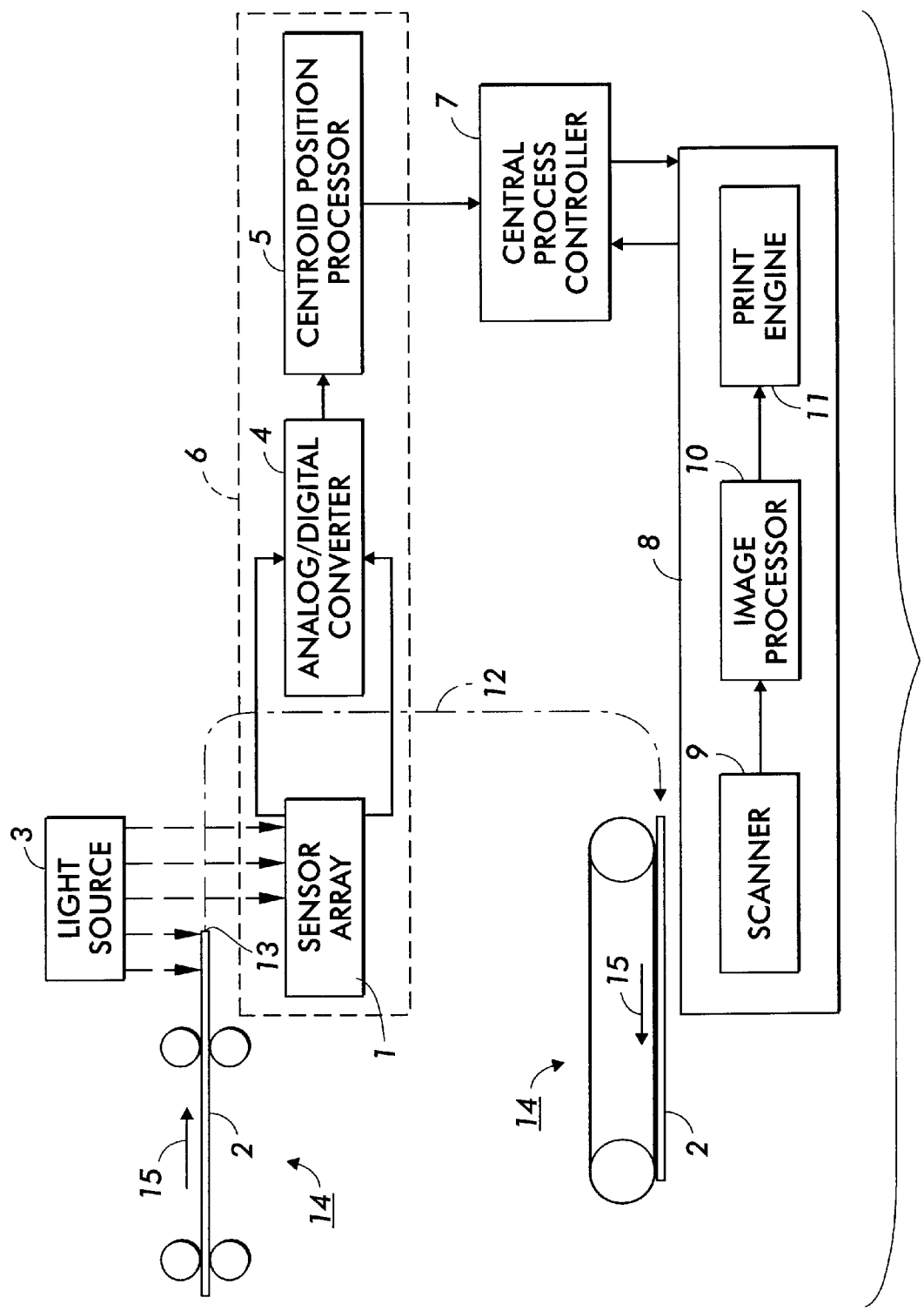
FIG. 1 is a block diagram of the position monitoring system of the subject invention.

As shown in FIG. 1, a sensor array 1 is constructed to provide an accurate indication of the position of an object, for example a document 2, as the document 2 progresses through an image processing system. The processing system may be for use in any number of applications for example, scanning, printing, copying, and the like. It can be used to track packages, luggage, or parts on an assembly line. With the use of low powered ir beams, even the position of people moving by a fixed location can be determined. This invention is useful in any situation where objects are moving past a sensor. The operation of this invention will be described in terms of a document 2 being processed within a multifunction printing machine 8 that includes a scanner 9, image processor 10, and print engine 11. The machine is controlled by a central process controller 7 which receives the document position information from the document monitoring system 6 and processes it for use in multiple functions throughout the printing machine operating cycle.

Monitoring system 6 consists of sensor array 1, which is positioned to receive light from a light source 3. Sensor array 1 generates a two channel signal from each sensor. The two channel signal is converted from analog to digital form in converter 4. The digital signal is used to calculate the position of the centroid of the light impinging on array 1 by the centroid position processor 5. As document 2 progresses through the operational path 12 of document handling system 14 in the general direction of arrow 15, it will generate a shadow, as it passes between light source 3 and sensor array 1. This will cause the centroid to move across the sensor array 2 and provide an accurate indication of the position of the edge 13 of document 2. As an alternative, reflected light could be used as the source by positioning the light source 3 on the same side as the detector array 1. In this instance, the light scatters off the paper into the detector. The centroid of the scattered light would also provide an accurate indication of the position of the edge 13 of document 2.

Figure 2:
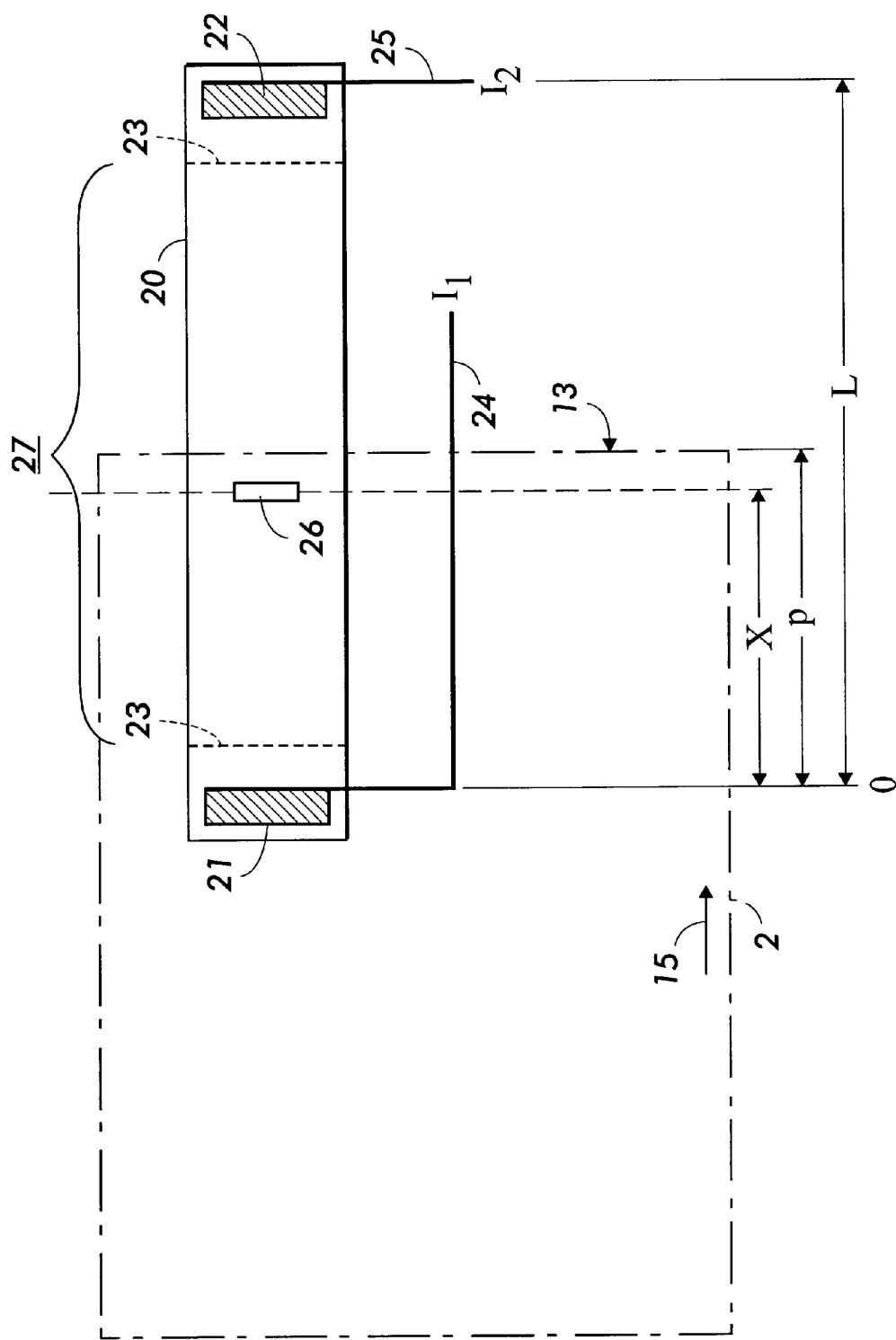
FIG. 2 is a schematic diagram of a position sensor used in the subject invention.

An individual position sensor 20 is shown schematically in FIG. 2. The sensor 20 is formed as a strip of silicon semiconductor material whose surface composition is stimulated by light to generate currents $I_1$ and $I_2$ flowing to its electrodes 21 and 22. Electrodes 21 and 22 are connected to leads 24 and 25 respectively. Currents $I_1$ and $I_2$ may be compared to obtain an indication of the position X of the centroid of light 26. As document 2 passes in the direction of arrow 15, the centroid X will move from left to right in FIG. 2. The centroid position, measured from electrode 21, may be calculated by the formula 1:

$$X = L/2 - (I_1 - I_2)L/\{2(I_1 + I_2)\} \text{ or } L[I_2/(I_1 + I_2)];$$

where L is the distance between the electrodes 21 and 22.

The position p of the edge 13, with respect to electrode 21, may then be determined by the formula 2:

$$p = 2X - L \text{ if } X > L/2 \text{ or } p = 2X \text{ if } X < L/2.$$

These formulas assume that the dark portions of the image are completely dark, and provide zero current. It is straightforward to extend them to the case when the dark portions have non-zero illumination by subtracting out the non-zero dark portions. It can be observed from these calculations that the accuracy of the resulting position will diminish as the edge approaches either electrode. In this case $I_1 \approx I_2$ so there is no accuracy for $X \approx L/2$ and therefore p switches between 0 and L for small noise fluctuations. This results in a zone of low signal to noise ration near the electrodes and resulting inaccuracies as indicated by dashed reference lines 23 of FIG. 2. The effective active area of each sensor is limited to the central region 26 of the sensor element. This characteristic of position sensors has limited their use in applications requiring high accuracy and large sensing areas. To avoid such limitations, an array of position sensors is constructed as described below.

Figure 3A:
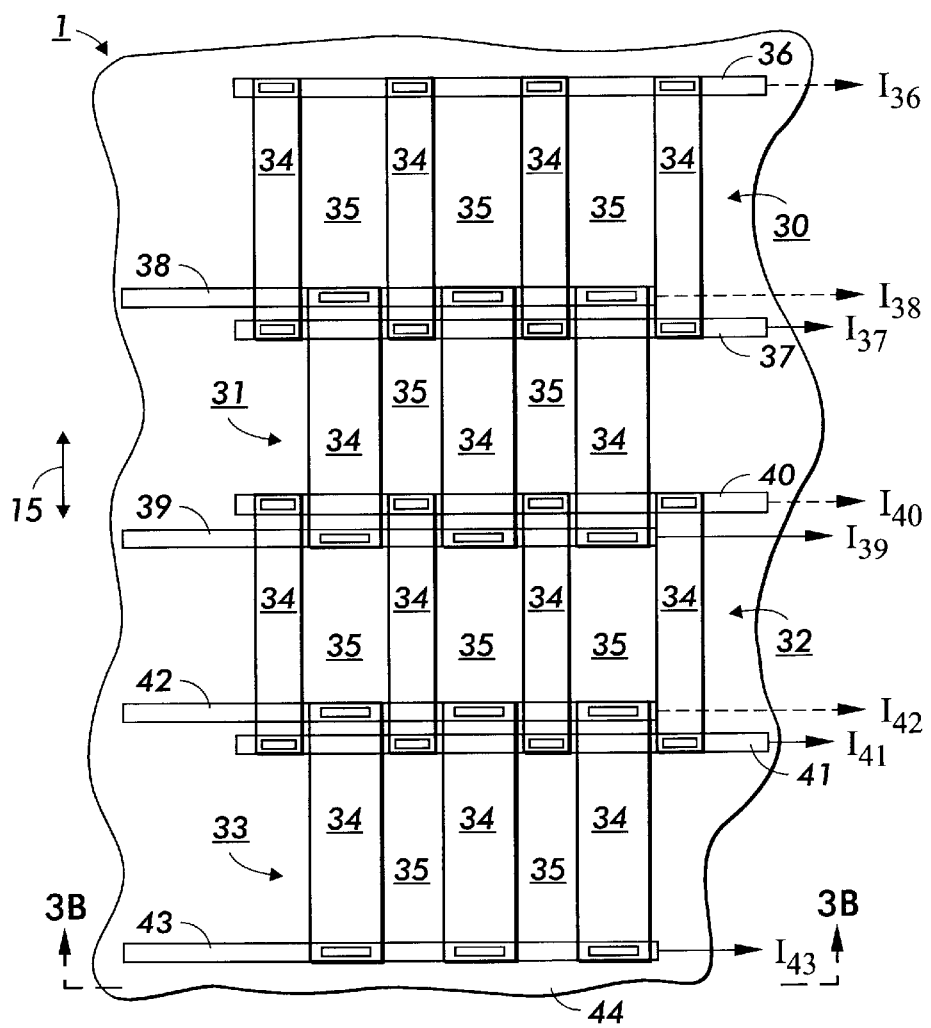
FIG. 3a is a top view of a first embodiment of an array of position sensors constructed according to the subject invention.

In the embodiment illustrated in FIG. 3a, the position sensor array 1 is constructed of groups 30–33 of position sensors 34. Each sensor in a group is spaced from its adjacent sensor by a gap 35. Groups 30–33 are arranged in an interleaved manner with the position sensors 34 of adjacent groups extending into the gaps 35 so that the ends of the sensors of each group overlap. This forms a sensing plane in which the regions of inaccuracy surrounding the electrodes of each sensor are offset from adjacent sensors to provide a continuous sensing surface. The sensing surface of this sensor array will be substantially free of dead spots and will provide an accurate representation of the position of either the leading or trailing edges of document 2 or other object moving in the direction of arrow 15 in FIG. 3a.

Figure 3B:
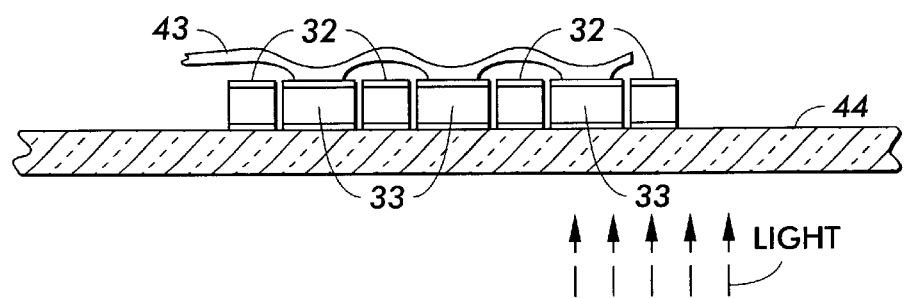
FIG. 3b is an edge view of a first embodiment of an array of position sensors constructed according to the subject invention.

Each pair of electrodes of the sensors 34 in group 30 are connected to buses 36 and 37. As the edge of document 2 passes group 30, currents $I_{36}$ and $I_{37}$ are generated in the respective buses. These currents are converted to digital form and are processed as described above to obtain the edge position of document 2. Similarly bus pairs 38 and 39, 40 and 41, and 42 and 43 connect the sensors 34 of groups 31–33 respectively. In this manner an array of position sensors is constructed and form a sensing plane which provides data from which an accurate reading of the position of the document 2 can be obtained. As shown in FIG. 3b, array 1 may be formed on a transparent substrate 44 to allow light radiated from below to impinge upon the sensor array. The position of the light source 3 would have to be altered if an opaque substrate is used, i.e., the light would have to enter from the top.

Figure 4:
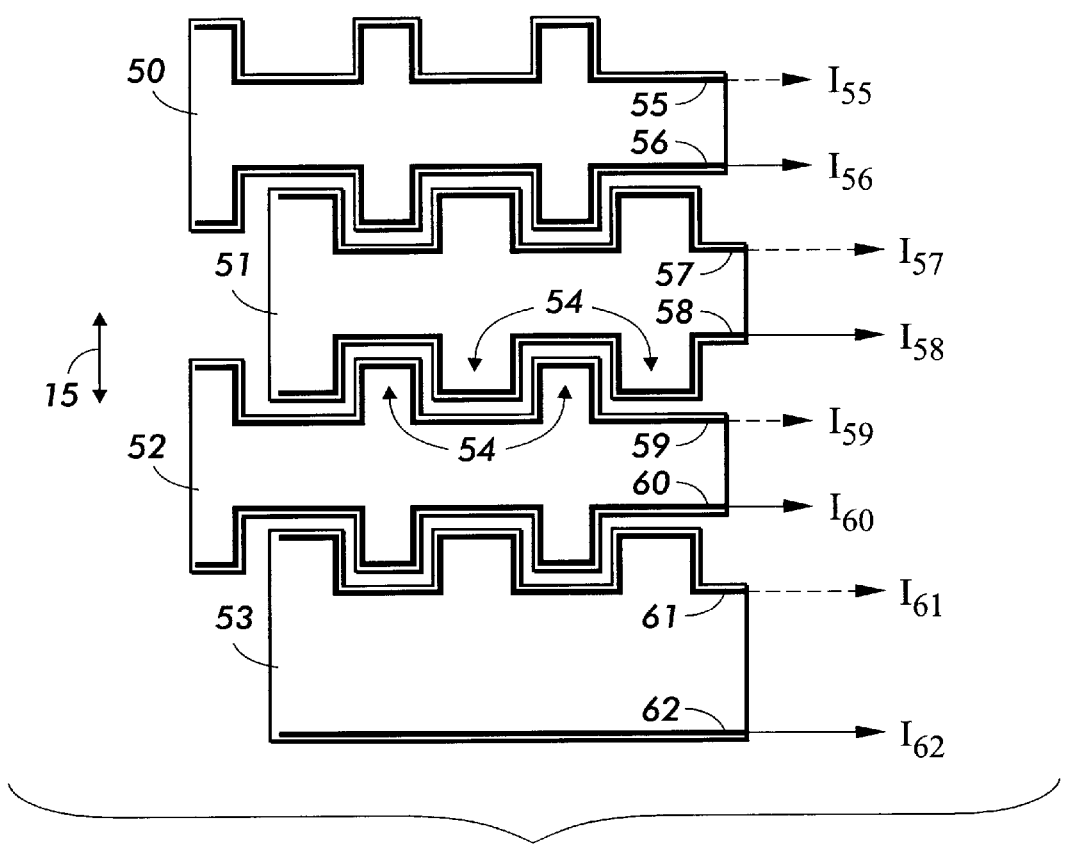
FIG. 4 second embodiment of an array of position sensors constructed according to the subject invention.

Instead of using individually formed sensors as shown in FIG. 3a, it may be advantageous to form the sensors in irregularly shaped strips 50–53 having electrodes 55, 56, 57, 58, 59, 60, 61 and 62 imbedded along the outer edges thereof, as shown in FIG. 4. In this embodiment each row of sensors 50, 51, 52, and 53 form a continuous surface. Projections, such as at 54 of each sensor are interleaved with the projections of neighboring sensors in order to overlap the central active regions of the sensors. This provides a continuous position signal without regard to the length of an individual sensor. The operation and signal processing in this embodiment will be comparable to the embodiment of FIG. 3. Sensor 50 is formed with edge electrodes 55 and 56, sensor 51 is formed with edge electrodes 57 and 58, sensor 52 is formed with edge electrodes 59 and 60 and sensor 53 is formed with electrode pair 61 and 62. This embodiment will provide more flexibility, and a reduction in manufacturing complexity. This embodiment provides continuous position information for an object moving in the direction of arrow 15 in FIG. 4.

Figure 5:
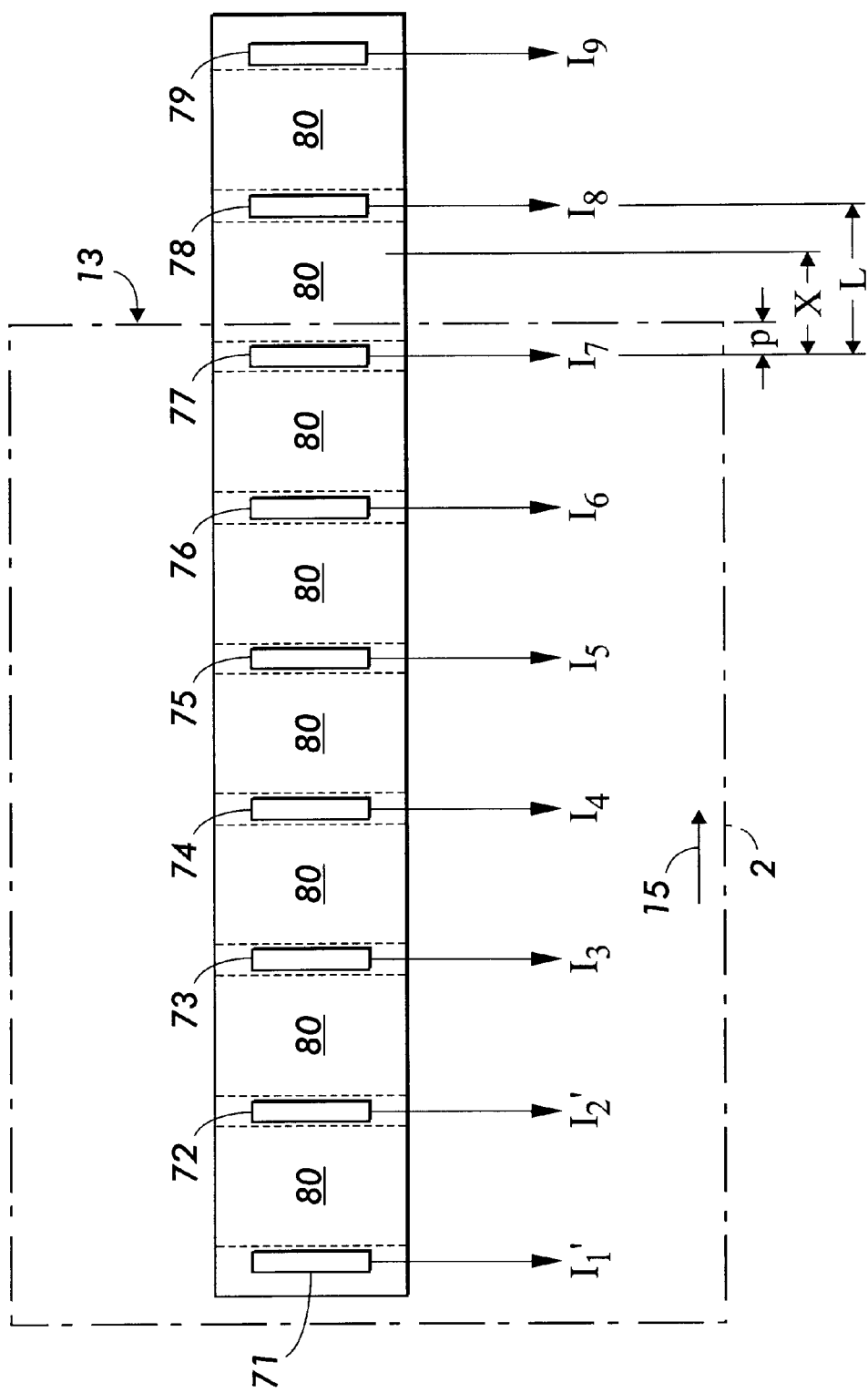
FIG. 5 is a third embodiment of an array of position sensors constructed according to the subject invention.

In a third embodiment of this invention, a strip of light sensitive material is constructed with an array of electrodes, as shown in FIG. 5. Electrodes 70–79 form the boundary of sensing zones 80 defined in between. The document or object will pass as shown by arrow 15 and sequentially generate currents collected by electrodes 70–79 from which the centroid of impinging light can be calculated as described above. Each electrode 70–79 is held at a ground potential to measure the current induced by the illuminated zone of the sensor. Unlike the preceding embodiments, illumination of the sensor zones adjacent to the zone containing the edge 13 generates a current contribution to the adjoining electrodes. The centroid position may be derived from an analysis of the four currents adjoining the edge. In particular currents $I_1'=I_7-1/2I_6$ and $I_2'=I_8-1/2I_9$ may be compared to obtain an indication of the position X of the centroid of the light X between electrodes 77 and 78. As document 2 passes in the direction of arrow 15, the centroid X will move from left to right in FIG. 5. The centroid position X measured from electrode 77 may be calculated by the formula 3:

$$X=L/2-(I_1'-I_2')L/\{2(I_1'+I_2')\}=L*I_2'/(I_1'+I_2');$$

where L is the distance between the electrodes 77 and 78.

The position p of the edge 13 with respect to electrode 77 may then be determined by the formula 4:

$$p=2X-L \text{ if } X>L/2 \text{ or } p=2X \text{ if } X<L/2.$$

As before these formulas assume that the dark portions of the image are completely dark, i.e. provide zero current. It is straightforward to extend them to the case when the dark portions have non-zero illumination by subtracting out the non-zero dark portions.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as defined by the claims.

We claim:

1. Apparatus for detecting the position of an object while it is moving in an operational path, said object having a leading or trailing edge in a direction of travel, said apparatus comprising:

a source of light positioned such that light generated thereby radiates on at least a portion of said path of said object as it moves through an operational cycle;

multiple position sensory zones, each having at least a pair of electrodes which are spaced to define one of said zones, each of said zones constructed of a light sensitive material which is stimulated by the impingement of light to generate at least a pair of signal currents conducted away from said sensory zone by said electrodes, said sensory zones arranged in an array positioned adjacent said path of said object near said light source, such that said object alters the distribution of light on said array as it moves in its operational path, each of said sensory zones having a central active region and said sensory zones being relatively positioned, such that at least one of said active regions of said sensory zones is presented to an edge of said object, wherein said signal currents are indicative of the position, relative to said electrodes; and a position processor connected to receive said signal currents, and calculate said object position therefrom.

2. Apparatus for detecting the position of an object while it is moving in an operational path, said object having a leading or trailing edge in a direction of travel, said apparatus, as described in claim 1, wherein each of said sensory zones comprises;

an independent position sensor having a pair of electrodes positioned at either end of an active region of said light sensitive material said position sensors being arranged on a common substrate in at least a first and a second group;

said first and second group of position sensors comprising multiple position sensors arranged in parallel relation and being spaced from adjacent position sensors to form gaps there between, said electrodes at each of said ends of said position sensors being connected to a common bus; and wherein the position sensors of said second group are interleaved to extend partially into said gaps formed between said first group such that said electrodes of said second group are adjacent said active region of said position sensors of said first group and said electrodes of said first group are adjacent said active region of said second group.

3. Apparatus for detecting the position of an object while it is moving in an operational path, said object having a leading or trailing edge in a direction of travel, said apparatus, as described in claim 2, wherein each of said at least two groups provides a two channel signal current for processing and said position processor includes an analog to digital converter which converts the two channel signal currents to digital form for further processing by the position processor.

4. Apparatus for detecting the position of an object while it is moving in an operational path, said object having a leading or trailing edge in a direction of travel, said apparatus, as described in claim 1, wherein said sensory zones are formed in elongated strips of light sensitive material and said electrodes are integrally formed at forward and trailing edges of said strips relative to the direction of object travel to form an active region between said electrodes, said edges of said strips being formed in an irregular shape; and further wherein said strips are arranged in parallel adjacent positions in which said irregular shaped edges are interleaved to provide an active region adjacent each of said electrodes.

5. Apparatus for detecting the position of an object while it is moving in an operational path, said object having a leading or trailing edge in a direction of travel, said apparatus, as described in claim 1, wherein said sensory zones are formed in a continuous strip of light sensitive material wherein said strip is divided into adjacent active segments by multiple electrodes integrally formed therewith, wherein each of said active segments contributes current to said electrodes of said adjacent active segment.

6. Apparatus for detecting the position of an object while it is moving in an operational path, said object having a leading or trailing edge in a direction of travel, said apparatus, as described in claim 1, wherein the sensory zones further comprise an active area extending between electrodes and wherein said sensory zones being relatively positioned such that an electrode of one sensory zone is adjacent an active area of another sensory zone.

7. Apparatus for detecting the position of an object while it is moving in an operational path, said object having a leading or trailing edge in a direction of travel, said apparatus, as described in claim 1, wherein the position processor includes an analog to digital converter which converts the signals from the array to digital form.

8. Apparatus for detecting the position of an object while it is moving in an operational path, said object having a leading or trailing edge in a direction of travel, said apparatus as described in claim 1, wherein said signal currents are indicative of a centroid of said light impinging on said sensory zone, and further wherein said centroid moves proportionally to the movement of said object and further wherein said position processor calculates said centroid position, and determines said position of said object therefrom.

9. A multifunction printing machine in which a document is moving in an operational path through an operational cycle, said document having a leading or trailing edge in a direction of travel, said printing machined comprising:

a scanner for generating an electronic image from said document;

a printer engine for reproducing the scanned image;

a controller for controlling the progress of the document and the operations performed thereon in said operational cycle;

a monitor for tracking the position of the document as it moves in its operational path, said monitor further comprising:

a source of light positioned such that light generated thereby radiates on at least a portion of said path of said document as it moves through an operational cycle;

multiple position sensory zones, each having at least a pair of electrodes which are spaced to define one of said zones, each of said zones constructed of a light sensitive material which is stimulated by the impingement of light to generate at least a pair of signal currents conducted away from said sensory zone by said electrodes, said sensory zones arranged in an array positioned adjacent said path of said document near said light source, such that said document alters the distribution of light on said array as said document moves in its operational path, each of said sensory zones having a central active region and said sensory zones being relatively positioned, such that at least one of said active regions of said sensory zones is presented to an edge of said document, wherein said signal currents are indicative of the position of said document, relative to said electrodes; and a position processor connected to receive said signal currents, and calculate said object position therefrom and transmit said signal to said controller.

10. A multifunction printing machine in which a document is moving in an operational path through an operational cycle, said document having a leading or trailing edge in a direction of travel, said printing machined, according to claim 9, wherein each of said sensory zones comprises:

an independent position sensor having a pair of electrodes positioned at either end of an active region of said light sensitive material said position sensors being arranged on a common substrate in at least a first and a second group;

said first and second group of position sensors comprising multiple position sensors arranged in parallel relation and being spaced from adjacent position sensors to form gaps there between, said electrodes at each of said ends of said position sensors being connected to a common bus; and wherein the position sensors of said second group are interleaved to extend partially into said gaps formed between said first group such that said electrodes of said second group are adjacent said active region of said position sensors of said first group and said electrodes of said first group are adjacent said active region of said second group.

11. A multifunction printing machine in which a document is moving in an operational path through an operational cycle, said document having a leading or trailing edge in a direction of travel, said printing machined, according to claim 10, wherein each of said at least two groups provides a two channel signal current for processing and said position processor includes an analog to digital converter which converts the two channel signal currents to digital form for further processing by the position processor.

12. A multifunction printing machine in which a document is moving in an operational path through an operational cycle, said document having a leading or trailing edge in a direction of travel, said printing machined, according to claim 9, wherein said sensory zones are formed in elongated strips of light sensitive material and said electrodes are integrally formed at forward and trailing edges of said strips relative to the direction of document travel to form an active region between said electrodes, said edges of said strips being formed in an irregular shape; and further wherein said strips are arranged in parallel adjacent positions in which said irregular shaped edges are interleaved to provide an active region adjacent each of said electrodes.

13. A multifunction printing machine in which a document is moving in an operational path through an operational cycle, said document having a leading or trailing edge in a direction of travel, said printing machined, according to claim 9, wherein said sensory zones are formed in a continuous strip of light sensitive material wherein said strip is divided into adjacent active segments by multiple electrodes integrally formed therewith, wherein each of said active segments contributes current to said electrodes of said adjacent active segment.

14. A multifunction printing machine in which a document is moving in an operational path through an operational cycle, said document having a leading or trailing edge in a direction of travel, said printing machined, according to claim 9, wherein the sensory zones further comprise an active area extending between electrodes and wherein said sensory zones being relatively positioned such that an electrode of one sensory zone is adjacent an active area of another sensory zone.

15. A multifunction printing machine in which a document is moving in an operational path through an operational cycle, said document having a leading or trailing edge in a direction of travel, said printing machined, according to claim 9, wherein the position processor includes an analog to digital converter which converts the signals from the array to digital form.

16. A multifunction printing machine in which a document is moving in an operational path through an operational cycle, said document having a leading or trailing edge in a direction of travel, said printing machined, according to claim 9, wherein said signal currents are indicative of a centroid of said light impinging on said sensory zone, and further wherein said centroid moves proportionally to the movement of said document and further wherein said position processor calculates said centroid position, and determines said position of said document therefrom.

* * * * *